United States Patent

Mankin et al.

Patent Number: 6,052,841
Date of Patent: *Apr. 25, 2000

[54] SYSTEM FOR PREVENTING TOILET OVERFLOWS

[75] Inventors: Howard Mankin, New York, N.Y.;
Peter Chapman, Sechelt, Canada;
Steve Kazemir, Coquitlam, Canada;
Derek Pyner, N Delta, Canada

[73] Assignee: Envision This, Inc., Brooklyn, N.Y.

[*] Notice: This patent is subject to a terminal disclaimer.

[21] Appl. No.: 09/273,181

[22] Filed: Mar. 19, 1999

Related U.S. Application Data

[63] Continuation of application No. 09/001,266, Dec. 31, 1997, Pat. No. 5,940,899.

[51] Int. Cl.⁷ .................. E03D 9/00; E03D 11/00
[52] U.S. Cl. .................. 4/427; 251/129.04; 251/129.12; 73/304 C
[58] Field of Search .................. 4/427, 366, 367, 4/405, 406, 415, 508, 668, 623; 73/304 C; 251/129.12, 129.04

[56] References Cited

U.S. PATENT DOCUMENTS

| | | | |
|---|---|---|---|
| 2,041,549 | 5/1936 | Jaeger . | |
| 3,987,502 | 10/1976 | Hartmann | 4/75 |
| 4,041,557 | 8/1977 | Ringler | 4/75 |
| 4,149,412 | 4/1979 | Fish | 73/304 C |
| 4,194,251 | 3/1980 | Pennerstorfer | 4/199 |
| 4,195,374 | 4/1980 | Morris et al. | 4/427 |
| 4,199,984 | 4/1980 | Huddart et al. | 73/304 |
| 4,203,173 | 5/1980 | Morris et al. | 4/427 |
| 4,258,444 | 3/1981 | Orzullok | 4/538 |
| 4,402,093 | 9/1983 | Luker et al. | 4/427 |
| 4,412,450 | 11/1983 | Franz et al. | 73/304 |
| 4,647,007 | 3/1987 | Bajka | 251/129.03 |
| 4,705,063 | 11/1987 | Robinson | 137/315 |
| 4,735,230 | 4/1988 | Detloff | 137/315 |
| 4,749,988 | 6/1988 | Berman et al. | 340/618 |
| 4,754,949 | 7/1988 | Fukamachi | 251/129.03 |
| 4,814,752 | 3/1989 | Lehman | 340/616 |
| 4,896,099 | 1/1990 | Suzuki | 324/667 |
| 4,989,277 | 2/1991 | Tsutsui et al. | 4/367 |
| 5,017,909 | 5/1991 | Goekler | 340/620 |
| 5,062,166 | 11/1991 | Krenecki | 4/427 |
| 5,432,959 | 7/1995 | Ellsworth et al. | 4/406 |
| 5,436,615 | 7/1995 | Williams | 340/616 |
| 5,460,007 | 10/1995 | Reed et al. | 62/137 |
| 5,493,877 | 2/1996 | Wickremasinghe | 69/208 |
| 5,524,299 | 6/1996 | Dalfino | 4/415 |
| 5,661,462 | 8/1997 | Shrewsbury-Gee | 340/618 |
| 5,699,833 | 12/1997 | Tsataros | 137/624.11 |
| 5,765,434 | 6/1998 | Harbaugh | 73/304 |

*Primary Examiner*—Charles R. Eloshway
*Attorney, Agent, or Firm*—Darby & Darby

[57] ABSTRACT

A system for preventing a toilet bowl from overflowing is disclosed. The system includes a sensor mounted to the toilet bowl at a location above a normal water level for the toilet bowl. The sensor is operative to sense the water level in the toilet bowl, and generates a warning signal if the level is above the normal level. The system further includes a valve connected to the water conduit feeding the toilet bowl, the valve being displaceable to respective open and closed positions. A drive assembly is connected to the valve to drive the valve to the open and closed positions. The system still further includes a processor electrically coupled with the sensor and the drive assembly to enable the drive assembly upon receiving the warning signal from the sensor.

17 Claims, 2 Drawing Sheets

SYSTEM FOR PREVENTING TOILET OVERFLOWS

This application is a continuation of U.S. patent application Ser. No. 09/001,266, filed on Dec. 31, 1997, now U.S. Pat. No. 5,940,899, the disclosure of which is hereby expressly incorporated by reference.

BACKGROUND OF THE INVENTION

1. Field of the Invention

The present invention relates to monitoring systems and, more particularly, to a system for monitoring a water level of a toilet and for interrupting the supply of water to the toilet in the event a clogged condition is determined.

2. Description of the Prior Art

Most residences today have indoor plumbing, which delivers water directly to sinks, bathtubs, and toilets for use by the occupants of the residence as needed. While indoor plumbing is a significant advance and indeed a requirement in most urban areas, there are also some drawbacks associated with indoor plumbing. One such drawback is that toilets will, from time to time, become clogged when the waste outlet line leading from the toilet bowl becomes obstructed with waste matter, toilet paper, or the like. Because conventional toilets are not equipped with any means for sensing and reacting to a clogged condition, those toilets will often overflow, resulting in a flooding condition in the lavatory area. Such flooding can cause significant property damage, as well as create an unsanitary condition, which is a burden to clean up.

Others in the past have proposed systems for detecting potential clogged conditions in toilets and for preventing an overflow from occurring by interrupting the supply of water to the toilet bowl. One such device is disclosed in U.S. Pat. No. 3,987,502 to Hartmann. The Hartmann '502 patent discloses an electrical sensing probe 50 that is placed inside of the toilet bowl. An overflow chamber is provided which extends about the entire rim of the bowl. The probe extends into the overflow chamber, and when water flows into the chamber, the water bridges the gap between the probe and the conductive side wall of the bowl, to initiate a signal to stop the flow of water to the toilet bowl. It is apparent that this system occupies a substantial amount of space within the toilet bowl and, because it is housed within the toilet bowl, will require repeated cleaning. Therefore, this system is not only inefficient, but undesirable as well.

Another such overflow prevention system is disclosed in U.S. Pat. No. 4,041,557 to Ringler. The Ringler '557 patent discloses an insulated electrode placed in a horizontal pipe 15 that delivers water to a toilet bowl. So long as water remains in the pipe, a circuit is closed between the electrode 47 and ground, which disables the toilet to prevent further flushings. However, this system requires that the pipe feeding the toilet be disposed in a horizontal configuration, and, therefore, is not suitable for use in many applications.

Yet another prior art device for preventing toilet overflows is disclosed in U.S. Pat. No. 4,195,374 to Morris et al., and includes an insulated electrical probe 37 housed inside a water flushing line 18. Once again, this invention requires a horizontal supply pipe in order to function.

U.S. Pat. No. 4,258,444 to Orszullok discloses an overflow system for detecting an overflow condition in a bathtub, and includes a capacitive sensor that is operative to detect the water level within the bathtub and to generate a control signal as the water level approaches the top of the tub. While such a device is arguably suitable for bathtub applications, this system is not suitable for use in toilet applications where the water level varies during the normal use of the toilet, for example during a standard toilet flush. In other words, a toilet flush will cause the capacitive sensor to detect that the water level has risen to the level of the sensor, thereby triggering a signal to stop the flow of water to the toilet bowl. Thus, if used in a toilet application, the capacitive sensor would detect a false positive every time the toilet is flushed.

Accordingly, it will be apparent that there continues to be a need for a reliable, efficient system for detecting a clogged toilet condition and for preventing an actual overflow from occurring. Furthermore, the need exists for such a system that does not require significant maintenance, periodic cleaning, or regular inspection. The present invention addresses these needs and others.

SUMMARY OF THE INVENTION

Briefly, and in general terms, the present invention provides a convenient, reliable system for detecting a clogged toilet condition and for interrupting the supply of additional water to the toilet in the event such a condition is detected in order to prevent an actual overflow from occurring. The system, in one embodiment, senses the water level within the toilet bowl, and determines whether the water is above a normal water level. In the event the water is above the normal water level for longer than a predetermined amount of time, the system closes the water line feeding the toilet bowl.

Thus, the system for preventing an overflow in the toilet bowl in one preferred embodiment comprises: a sensor mounted to the toilet at a location above a normal water level for the toilet, the sensor being operative to sense a water level in the toilet bowl above the normal water level and responsive thereto to generate a warning signal; a valve connected to the water conduit and being manipulable to respective open and closed positions; a drive assembly connected to the valve and operative to selectively drive the valve to the respective open and closed positions; and a processor electrically connected to the sensor and the drive assembly, and operative to control the sensor to sense the water level in the toilet at predetermined intervals, the processor being responsive to receiving plural consecutive warning signals from the sensor to enable the drive assembly to drive the valve to the closed position to close the water conduit.

In another embodiment, the present invention is directed to a capacitive sensor for sensing a clogged condition in a toilet bowl, and comprises: a housing mounted to an exterior portion of the toilet bowl; a pair of substantially coplanar capacitance plates connected to the housing, with at least one of the plates being charged to create an electric field in the area spaced outwardly from the plates; and a timer IC chip connected to the plates and operative to generate as an output a pulse train having a frequency dependent upon the capacitance between the plates, whereby the capacitance between the plates is dependent upon a dielectric occupying the area spaced outwardly from the plates.

Other features and advantages of the present invention will become apparent from the following detailed description, taken in conjunction with the accompanying drawings which illustrate, by way of example, the features of the present invention.

DETAILED DESCRIPTION OF THE PREFERRED EMBODIMENT

Figure 1:
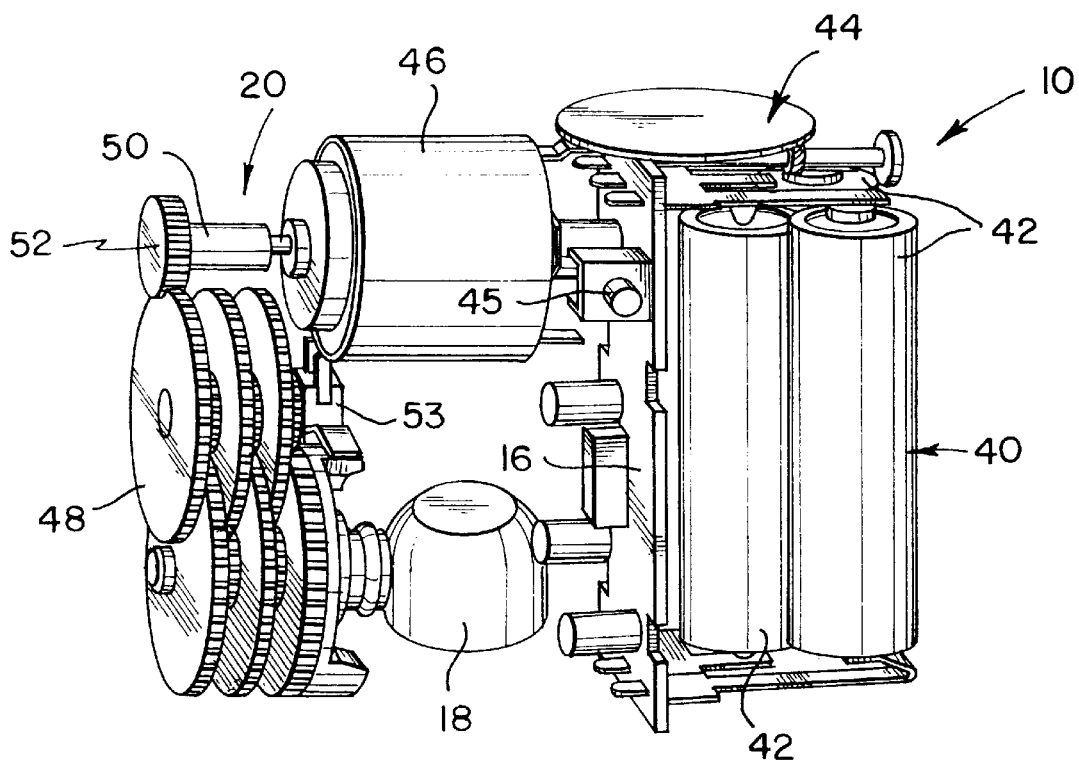
FIG. 1 is a schematic diagram of a system for detecting a clogged toilet condition and for preventing such an overflow constructed in accordance with the present invention.
Figure 4:
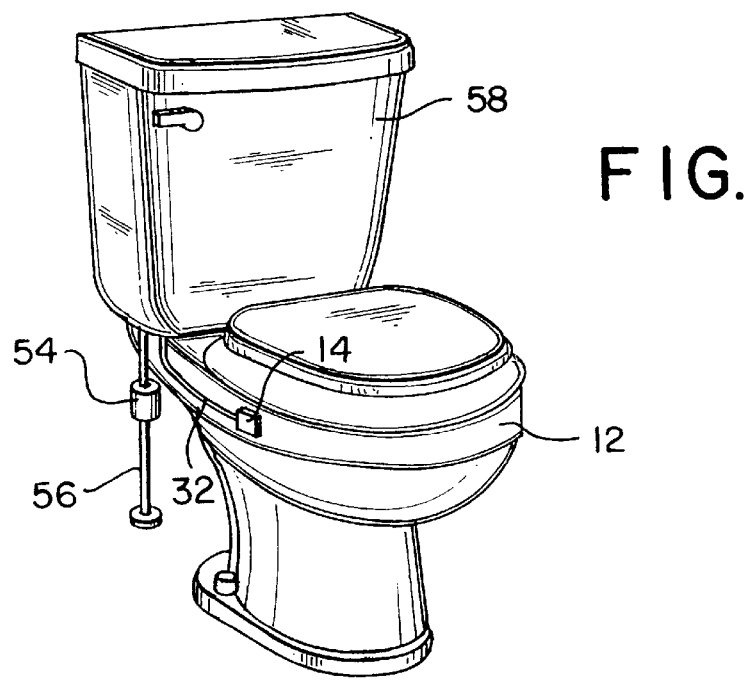
FIG. 4 is a perspective view of the system of the present invention attached to a conventional toilet.

In the following detailed description, like reference numerals will be used to refer to like or corresponding elements in the different figures of the drawings. Referring now to FIGS. 1 and 4, there is shown a system 10 for monitoring the water level inside a toilet bowl 12, for detecting a clogged condition within the toilet bowl, and for preventing an overflow from occurring. The system preferably includes a sensor 14 (FIG. 2) that is securely placed on the outside or exterior surface of a toilet bowl to sense the water level within the toilet bowl (FIG. 4). The system further includes a processor 16, a valve 18, and a drive assembly 20, all of which cooperate to detect a clogged condition and to prevent such an overflow, as described in greater detail below.

Figure 2:
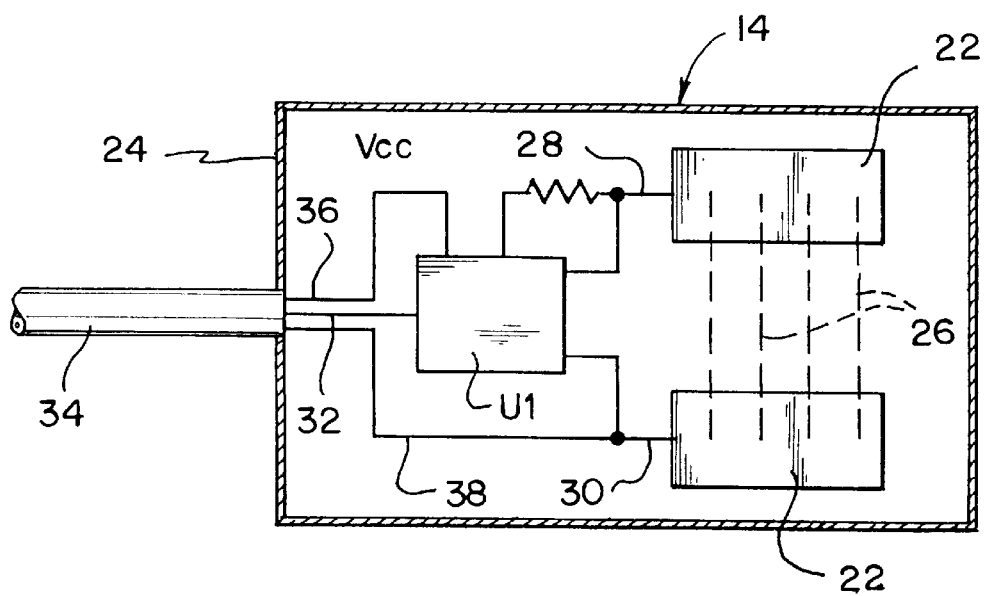
FIG. 2 is a schematic diagram of a capacitive sensor included in a preferred embodiment of the system of FIG. 1.

Referring now to FIG. 2, the sensor 14 will be described in greater detail. The sensor, in one preferred embodiment, comprises a capacitive sensor and includes a pair of capacitor plates 22 mounted on a housing 24. The plates are arranged in a substantially coplanar configuration and generate an electric field therebetween as is shown schematically in FIG. 2 by the plural field lines 26. The sensor further includes a timer chip U1, which in a preferred embodiment comprises a 555 timer circuit. The timer chip U1 is electrically connected to each of the capacitor plates along lines 28 and 30. The timer chip senses the capacitance between the plates and generates a corresponding pulse train of variable frequency. Thus, the timer chip serves as a variable frequency oscillator, with the variation in frequency being a result of the varying capacitance between the capacitor plates. The pulse train is output along signal line 32 to the processor 16. The sensor is physically tethered to the other components of the system 10 by a cable 34 which carries the signal line 32, as well as a power line 36 and a common ground line 38.

Thus, it will be understood by those of ordinary skill in the art that the capacitance between the capacitor plates 22 will vary depending on the dielectric occupying the area immediately above the plates. If the dielectric is air, a particular capacitance will result. If the dielectric instead is water, then a different capacitance will result across the plates. This different capacitance causes the timer chip U1 to change the frequency of the pulses it outputs, which is used to detect a high water level that is indicative of a potential clogged condition. This change in frequency is recognized as a warning signal, as described in greater detail below.

Figure 3:
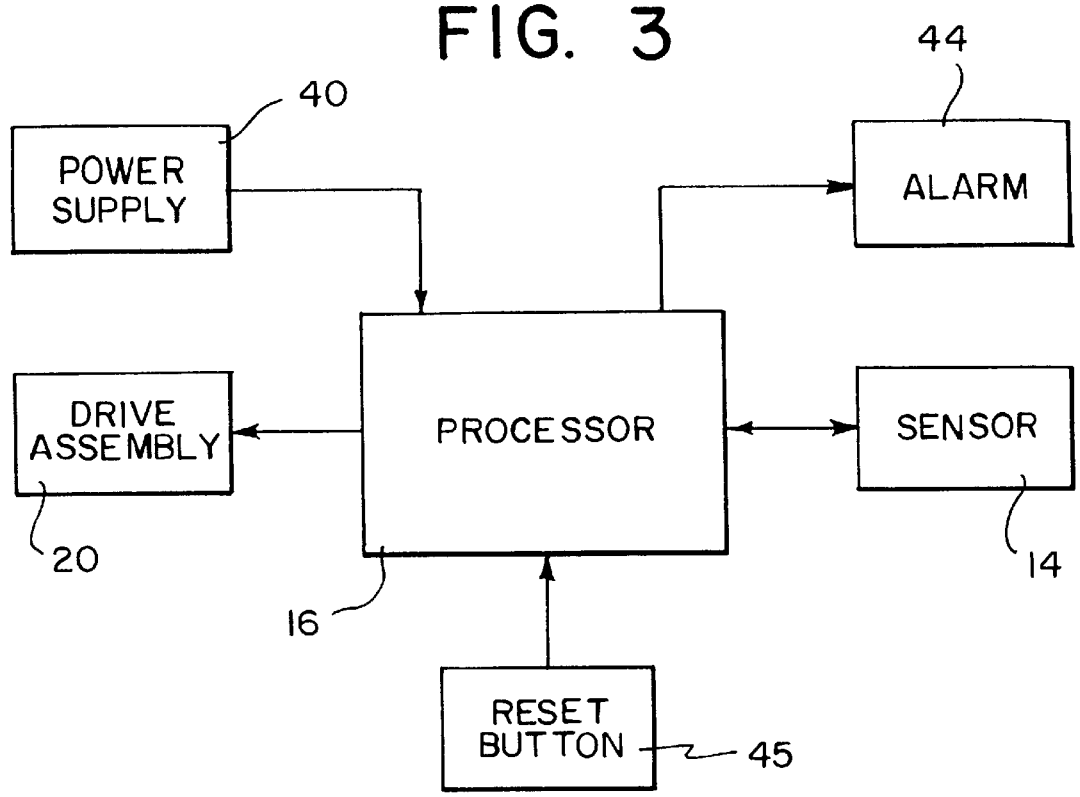
FIG. 3 is a block diagram of a control system included in the system of FIG. 1.

Referring now to FIG. 3, the electronic components of the system 10 will now be described in greater detail. The system includes the processor 16, which is electrically connected to the sensor 14 via lines 32 and 36 for two-way communication therebetween. At predetermined intervals, such as every three to four seconds, the processor prompts the sensor along power line 36 for an indication of the capacitance between the plates 22. The timer chip U1 transmits a corresponding pulse train along signal line 32 to the processor, which is interpreted by the processor to determine the capacitance represented by the pulse train. The processor is programmed to determine from the measured capacitance whether a potential clogged condition exists or not, based on the value of the capacitance.

If a regular flush coincides with one of the readings, the reading will give a false indication as to the actual conditions within the toilet bowl. In other words, the reading will indicate that the water level has reached the height of the capacitive sensor. Therefore, the processor 16 is programmed to require several consecutive warning signals showing a potential clogged condition before the processor will recognize an actual clogged condition. The processor is preferably programmed to enable the sensor to take a reading every three to four seconds, with the processor programmed to require two (or more) consecutive readings to show a potential clogged condition before an actual clogged condition is determined. Each warning signal received by the processor increments an internal counter, whereas a normal reading resets the counter. Once the counter reaches a selected value, for example two, the processor determines that an actual overflow condition exists. In this manner, the system will not be falsely triggered during a regular flush. Of course, the amount of time that has elapsed between the first positive signal and the last positive signal is greater than the duration of a typical flush cycle to ensure that a false positive signal will not be generated. This amount of time will vary from toilet to toilet and, thus, can vary depending upon the type of toilet that the sensor is placed on.

The processor 16 is also electrically connected to the drive assembly 20. Upon determining that an actual clogged condition exists, the processor enables the drive assembly to drive the valve 18 to its closed position, thereby closing off the water supply to the toilet bowl to prevent an overflow. The valve is preferably a rotary ball valve that may be rotated through 90 degrees between the opened and closed positions. The drive assembly includes a DC drive motor 46 and a reduction gear train 48. The drive motor includes a drive shaft 50 and gear 52 meshed with the gear train. The gear train is operative to reduce the rotation speed of the DC motor and increase the torque applied to the valve to ensure reliable opening and closing of the valve. A CAM switch 53 is connected to the gear train 48 and to the valve 18 to control the direction of rotation of the valve.

The processor 16 is electrically connected to a power supply 40, which in the preferred embodiment comprises a pair of batteries 42 (FIG. 1). The power supply provides DC power to the processor, as well as the sensor 14, an alarm 44, and the drive assembly 20.

The alarm 44 is intermittently actuated by the processor 16, after determining that an actual clogged condition exists, to generate an audible signal to alert the occupants of the residence that the toilet is clogged and needs attention. In the preferred embodiment, the alarm comprises a piezo buzzer. The processor is preferably also programmed to intermittently actuate the buzzer when the batteries are low.

The system 10 further includes a manual reset button 45 that is electrically connected to the processor 16. The reset button may be pressed by a person after a clogged toilet has been unclogged. When the button is pressed, the processor prompts the sensor 14 to take a reading, and if the reading is of a normal condition, the processor enables the drive assembly 20 to drive the valve 18 to the opened position. If, on the other hand, the water is still above the normal water level, the system remains in the triggered state and does not open the valve.

The reset button 45 may also be used as a manual override button. During normal operation, the reset button may be depressed for a predetermined interval, such as for five seconds. The processor is responsive to this to close the valve 18. By manually holding the button for another five seconds, the processor enables the drive assembly to re-open the valve.

The system 10 preferably includes a housing 54 to contain the components of the system except for the external sensor 14. The housing is configured for engagement with a water supply line 56 that supplies water to the toilet tank 58. The housing further includes an internal conduit (not shown) to which is connected valve 18.

The processor 16 is preferably calibrated to profile the normal flush of the particular toilet to which the system 10 is attached, with such information being stored for future reference by the processor. This feature enables the processor to differentiate between a normal flush, and an overflow condition, as described below. The calibration is carried out by manually pressing the reset button 45 during normal operating conditions. In the calibration mode, the processor controls the sensor 14 to sense the capacitance between the plates 22 very frequently, such as every 250 milliseconds. The user then flushes the toilet, and the processor determines an average peak level for the flush by averaging the four largest peak capacitance values that were sensed during the flush. During normal operation, the processor checks the sensed capacitance every 2 to 3 seconds. If the average peak level is exceeded, then the toilet bowl is undergoing either a flush or overflow condition. The processor continues to monitor the condition over 3 to 4 periods, and if the detected value remains above the calibrated average peak value, then an overflow condition is detected.

From the foregoing, it will be apparent that the system 10 of the present invention provides a reliable and convenient system for determining when a clogged condition exists in a toilet and for preventing an overflow from occurring.

While a particular form of the invention has been described, it will be apparent to those skilled in the art that various modifications and improvements may be made without departing from the spirit and scope of the invention. As such, it is not intended that the invention be limited, except as by the appended claims.

What is claimed is:

1. A system for preventing overflows in a toilet connected to a water conduit, said system comprising:
   a sensor adapted to be mounted to the toilet at a selected location, the sensor being operative to sense a water level in the toilet at or above the selected location and responsive thereto to generate a signal;
   a valve adapted to be connected to the water conduit and being manipulable to respective open and closed positions;
   a drive assembly connected to the valve and operative to selectively drive the valve to the respective open and closed positions; and
   a processor electrically connected to the sensor and the drive assembly, and responsive to receiving a predetermined number of consecutive warning signals indicative of a potential overflow condition from the sensor at predetermined intervals to enable the drive assembly to drive the valve to the closed position to close the water conduit, the predetermined intervals being selected based on the flushing duration of the toilet to avoid a false positive signal.

2. The system of claim 1 wherein the sensor comprises a capacitive sensor.

3. The system of claim 2 wherein the capacitive sensor is adapted to be mounted on the outside of the toilet above a normal water level of the toilet.

4. The system of claim 3 wherein the drive assembly comprises a drive motor electrically connected to the processor, the drive motor being operative to manipulate the valve between the respective open and closed positions.

5. The system of claim 4 wherein the drive assembly further includes a gear train interposed between the drive motor and valve.

6. The system of claim 2 wherein the capacitive sensor comprises a pair of substantially coplanar capacitor plates.

7. The system of claim 2 wherein the capacitive sensor includes a 555 timer to convert the capacitance sensed into a pulse train, wherein the frequency of the pulse train is dependent upon the capacitance sensed.

8. The system of claim 1 and further including a housing containing the processor, valve, and drive assembly therein, the housing including a water inlet to engage an upstream portion of the water conduit and a water outlet to engage a downstream portion of the water conduit.

9. The system of claim 8 and further including a power supply electrically connected to the processor and drive assembly to provide power thereto.

10. The system of claim 9 wherein the power supply comprises a pair of batteries mounted in the housing.

11. The system of claim 1 and further including an audible signal generator connected to the processor, wherein the processor, upon actuating the drive assembly, controls the audible signal generator to generate an audible signal indicative of a clogged condition.

12. The system of claim 11 wherein the audible signal generator comprises a piezo buzzer.

13. A system for preventing overflow in a toilet bowl connected to a water conduit, said system comprising:
   a sensor adapted to be mounted to an exterior of the toilet bowl at a location above a normal water level for the toilet, the sensor being operative to sense a water level in the toilet above the normal water level and responsive thereto to generate a warning signal;
   a valve adapted to be connected to the water conduit and being manipulable to respective open and closed positions;
   a drive assembly connected to the valve and operative to drive the valve to the respective open and closed positions; and
   a processor electrically connected to the sensor and the drive assembly, and operative to control the sensor to sense the water level in the toilet at predetermined intervals, the processor being responsive to receiving plural consecutive warning signals indicative of a potential overflow condition from the sensor to enable the drive assembly to drive the valve to the closed position to close the water conduit, the predetermined intervals being selected based on the flushing duration of the toilet to avoid a false positive signal.

14. The system of claim 13 wherein the drive assembly comprises a drive motor electrically connected to the processor, and a gear train interposed between the drive motor and valve.

15. The system of claim 13 and further including an audible signal generator connected to the processor, wherein the processor, upon actuating the drive assembly, controls the audible signal generator to generate an audible signal to indicate a clogged condition.

16. The system of claim 13 wherein the sensor comprises a capacitive sensor including a pair of substantially coplanar capacitor plates.

17. The system of claim 16 wherein the capacitive sensor includes a 555 timer to convert the capacitance sensed into a pulse train, wherein the frequency of the pulse train is dependent upon the capacitance sensed.

\* \* \* \* \*